United States Patent
Hong

(10) Patent No.: US 11,265,924 B2
(45) Date of Patent: Mar. 1, 2022

(54) METHOD AND DEVICE FOR DATA TRANSMISSION

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 27 days.

(21) Appl. No.: 16/843,465

(22) Filed: Apr. 8, 2020

(65) Prior Publication Data

US 2020/0236720 A1 Jul. 23, 2020

Related U.S. Application Data

(63) Continuation of application No. PCT/CN2017/105661, filed on Oct. 11, 2017.

(51) Int. Cl.
*H04W 74/08* (2009.01)
*H04W 76/19* (2018.01)
*H04W 76/27* (2018.01)
*H04W 28/10* (2009.01)

(52) U.S. Cl.
CPC ....... *H04W 74/0833* (2013.01); *H04W 28/10* (2013.01); *H04W 76/19* (2018.02); *H04W 76/27* (2018.02)

(58) Field of Classification Search
CPC .......... H04L 5/0053; H04W 28/0278; H04W 76/19; H04W 76/27
See application file for complete search history.

(56) References Cited

U.S. PATENT DOCUMENTS

| | | | |
|---|---|---|---|
| 8,848,610 B2 | 9/2014 | Miklós et al. | |
| 9,497,566 B2 | 11/2016 | Aghili et al. | |
| 9,872,228 B2 | 1/2018 | Aghili et al. | |
| 2012/0213165 A1 | 8/2012 | Miklós et al. | |
| 2013/0100895 A1 | 4/2013 | Aghili et al. | |
| 2017/0064611 A1 | 3/2017 | Aghili et al. | |
| 2018/0103418 A1 | 4/2018 | Aghili et al. | |

(Continued)

FOREIGN PATENT DOCUMENTS

| | | | |
|---|---|---|---|
| CN | 102457825 A | 5/2012 | |
| CN | 103155605 A | 6/2013 | |

(Continued)

OTHER PUBLICATIONS

NEC. "Location Update at RAN-Based Notification Area Boundary" R2-1705269, 3GPP TSG-RAN WG2 #98, Hangzhou, China, May 15-19, 2017, pp. 1-5.

(Continued)

*Primary Examiner* — Gary Mui
(74) *Attorney, Agent, or Firm* — Finnegan, Henderson, Farabow, Garrett & Dunner, L.L.P.

(57) ABSTRACT

A method for transmitting data, includes: in response to detecting uplink data to be transmitted to a base station, saving the uplink data in a designated buffer; in response to starting Radio Access Network Location Area Update (RLAU), reading the uplink data in the designated buffer; and transmitting the uplink data to the base station through request signaling corresponding to the RLAU, such that the base station acquires the uplink data in the request signaling.

9 Claims, 19 Drawing Sheets

(56) References Cited

U.S. PATENT DOCUMENTS

| | | | | |
|---|---|---|---|---|
| 2018/0234890 | A1* | 8/2018 | Shih | H04W 36/0005 |
| 2019/0053324 | A1* | 2/2019 | Tseng | H04W 76/30 |
| 2019/0289570 | A1* | 9/2019 | Kim | H04W 76/27 |
| 2019/0320476 | A1* | 10/2019 | Wang | H04W 28/0268 |
| 2020/0037345 | A1* | 1/2020 | Ryoo | H04W 72/1284 |
| 2020/0120476 | A1* | 4/2020 | Lee | H04W 60/02 |
| 2020/0128443 | A1* | 4/2020 | Na | H04W 28/0247 |
| 2020/0221524 | A1* | 7/2020 | Jiang | H04W 76/19 |
| 2020/0283164 | A1* | 9/2020 | Zhao | B64D 43/00 |

FOREIGN PATENT DOCUMENTS

| | | |
|---|---|---|
| CN | 103155615 A | 6/2013 |
| CN | 106131886 A | 11/2016 |
| WO | WO 2011/119680 A2 | 9/2011 |

OTHER PUBLICATIONS

International Search Report in the International Application No. PCT/CN2017/105661, dated Jun. 28, 2018.
English translation of the Written Opinion of the International Search Authority in the International Application No. PCT/CN2017/105661, dated Jun. 28, 2018.
LG Electronics: "Data transmission during random access procedure in MTC", 3GPP TSG RAN WG1 Meeting #89, R1-1707570, Hangzhou, P.R. China, May 15-19, 2017, 5 pages.
Interdigital Inc: "Open Issues on Connection Control Procedures", 3GPP RAN WG2 Meeting #99bis, R2-1710666, Prague, Czech Republic, Oct. 9-13, 2017, 6 pages.
Intel Corporation: "Email discussion report on [98#30][NR] RRC Connection Control", 3GPP TSG RAN WG2 Meeting Ad-hoc, R2-1707038, Qingdao, China, Jun. 27-29, 2017, 58 pages.
Qualcomm Incorporated: "Early data transmission", 3GPP TSG RAN WG1 Meeting #90, R1-1712804, Prague, Czechia, Aug. 21-25, 2017, 17 pages.
Extended European Search Report in European Application No. 17928539.0, dated Apr. 7, 2021.
ETSI MCC: "Report of 3GPP TSG RAN WG2 meeting #94", 3GPP TSG-RAN Working Group 2 meeting #95 R2-164670, Gothenburg, Sweden, Aug. 23-26, 2016, 217 pages.
ETSI MCC: "Report of 3GPP TSG RAN WG2 meeting #95bis", 3GPP TSG-RAN Working Group 2 meeting #96 R2-167461, Reno, Nevada, US, Nov. 14-18, 2016, 195 pages.
ETSI MCC: "Report of 3GPP TSG RAN WG2 meeting #96", 3GPP TSG-RAN Working Group 2 meeting #97 R2-1700671, Athens, Greece, Feb. 13-17, 2017, 231 pages.
ETSI MCC: "Report of 3GPP TSG RAN2#98", 3GPP TSG-RAN WG2 meeting #99 R2-1707601, Berlin, Germany, Aug. 21-25, 2017, 294 pages.
Examination Report dated Nov. 9, 2021, from the Indian Patent Office in counterpart Indian Application No. 202047019622.

* cited by examiner

METHOD AND DEVICE FOR DATA TRANSMISSION

CROSS-REFERENCE TO RELATED APPLICATIONS

This application is a continuation of International Application No. PCT/CN2017/105661 filed on Oct. 11, 2017, the content of which is hereby incorporated by reference in its entirety.

TECHNICAL FIELD

The present disclosure relates to the field of communication, and in particular to a method and device for transmitting data.

BACKGROUND

A new user equipment (UE) state, i.e., an inactive state, is introduced in a next-generation communication network, i.e., a 5th Generation (5G) mobile communication technology network. In related art, a conventional Long Term Evolution (LTE) network does not support the inactive state or provide a solution for transmitting data directly to UE in the inactive state.

SUMMARY

According to a first aspect of embodiments of the subject disclosure, a method for transmitting data, applying to user equipment (UE), includes: in response to detecting uplink data to be transmitted to a base station, saving the uplink data in a designated buffer; in response to starting Radio Access Network Location Area Update (RLAU), reading the uplink data in the designated buffer; and transmitting the uplink data to the base station through request signaling corresponding to the RLAU, such that the base station acquires the uplink data in the request signaling.

According to a second aspect of embodiments of the subject disclosure, a method for transmitting data, applying to a base station, includes: in response to detecting downlink data to be transmitted to user equipment (UE), saving the downlink data in a designated buffer; in response to detecting that the UE has started Radio Access Network Location Area Update (RLAU), reading the downlink data in the designated buffer; and transmitting the downlink data to the UE in response signaling corresponding to the RLAU, such that the UE acquires the downlink data in the response signaling.

According to a third aspect of embodiments of the subject disclosure, user equipment (UE) includes a processor; and a memory storing an instruction executable by the processor, wherein the processor is configured to: in response to detecting uplink data to be transmitted to a base station, save the uplink data in a designated buffer; in response to starting Radio Access Network Location Area Update (RLAU), read the uplink data in the designated buffer; and transmit the uplink data to the base station through request signaling corresponding to the RLAU, such that the base station acquires the uplink data in the request signaling.

According to a fourth aspect of embodiments of the subject disclosure, a base station includes a processor; and a memory storing an instruction executable by the processor, wherein the processor is configured to: in response to detecting downlink data to be transmitted to user equipment (UE), save the downlink data in a designated buffer; in response to detecting that the UE has started Radio Access Network Location Area Update (RLAU), read the downlink data in the designated buffer; and transmit the downlink data to the UE in response signaling corresponding to the RLAU, such that the UE acquires the downlink data in the response signaling.

The technical solution provided by embodiments of the present disclosure includes the following beneficial effects.

In the embodiments, having detected uplink data to be transmitted to a base station, UE may first save the uplink data in a designated buffer. Then, while starting RLAU, the UE may read the uplink data in the designated buffer. The UE may transmit the uplink data to the base station through request signaling corresponding to the RLAU, thereby implementing combination of an RLAU flow with data transmission, allowing the base station to receive uplink data transmitted by UE in an inactive state, as well as improving efficiency in data transmission.

In the embodiments, having detected downlink data to be transmitted to UE, instead of triggering paging, a base station may first save the downlink data in a designated buffer. Then, when it is detected that the UE has started RLAU, the base station may read the downlink data in the designated buffer. The base station may transmit the downlink data to the UE through response signaling corresponding to the RLAU, thereby implementing combination of an RLAU flow with data transmission, allowing the base station to transmit downlink data to UE in an inactive state, as well as improving efficiency in data transmission.

The above general description and elaboration below are exemplary and explanatory, and do not limit the disclosure.

BRIEF DESCRIPTION OF THE DRAWINGS

The accompanying drawings are incorporated in and constitute part of the specification, illustrate embodiments of the disclosure, and together with the disclosure, serve to explain the principle of the disclosure.

DETAILED DESCRIPTION

Reference will now be made in detail to exemplary embodiments, examples of which are illustrated in the accompanying drawings. The following description refers to the accompanying drawings, in which the same numbers in different drawings represent the same or similar elements unless indicated otherwise. Implementations set forth in the following exemplary embodiments do not represent all implementations in accordance with the present disclosure. Rather, they are merely examples of devices and methods in accordance with certain aspects herein as recited in the appended claims.

Terms used in the disclosure are for describing exemplary embodiments instead of limiting the disclosure. For example, the term "and/or" used in the disclosure refers to and includes any or all possible combinations of one or more associated items listed. Also for example, the terms "first," "second," etc. may be used to describe various kinds of information, such information should not be limited to such a term. For example, without departing from the scope of the embodiments herein, first information may also be referred to as second information. Similarly, second information may also be referred to as first information.

Figure 1:
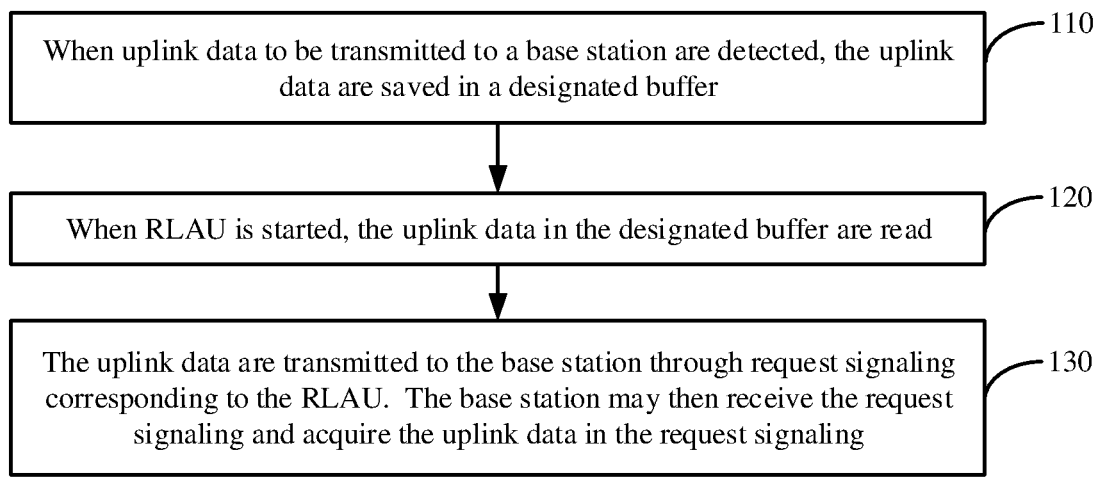
FIG. 1 is a flowchart of a method for transmitting data according to an exemplary embodiment.
Figure 2:
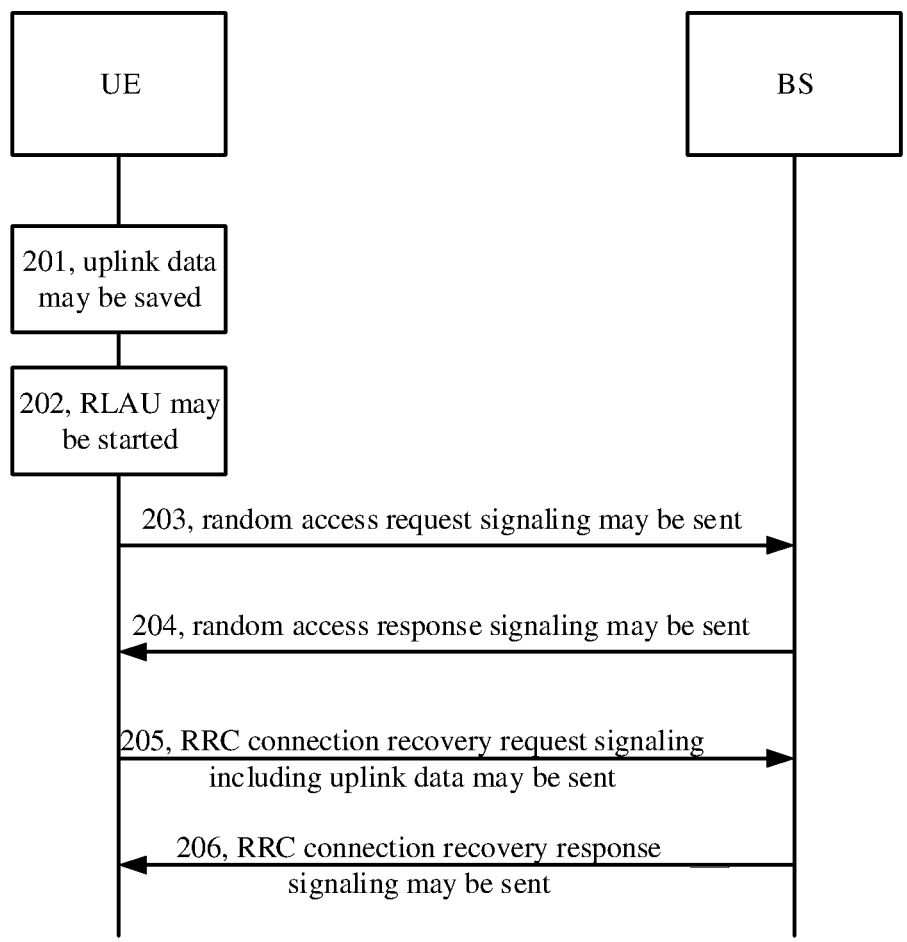
FIG. 2 is a schematic diagram of a method for transmitting data according to an exemplary embodiment.

FIG. 1 is a flowchart of a method for transmitting data according to an exemplary embodiment. FIG. 2 is a schematic diagram of a method for transmitting data according to an exemplary embodiment. The method for transmitting data may apply to user equipment (UE). As shown in FIG. 1, the method for transmitting data may include the following steps.

In step 110, when uplink data to be transmitted to a base station are detected, the uplink data are saved in a designated buffer.

In an embodiment, the UE may be in an inactive state.

When uplink data to be transmitted to the base station are detected, the UE may first save the uplink data in the designated buffer. Then, the uplink data may be transmitted to the base station along with request signaling corresponding to Radio Access Network Location Area Update (RLAU) when the UE starts the RLAU. The designated buffer may be a buffer of the UE.

In step 120, when RLAU is started, the uplink data in the designated buffer are read.

In step 130, the uplink data are transmitted to the base station through request signaling corresponding to the RLAU. The base station may then receive the request signaling and acquire the uplink data in the request signaling.

In an embodiment, the request signaling corresponding to RLAU may be request signaling sent by the UE to the base station. The request signaling may be random access request signaling sent by the UE to the base station. The request signaling may be Radio Resource Control (RRC) connection recovery request signaling sent by the UE to the base station.

As shown in FIG. 2, an exemplary scene may include the base station and the UE. The UE may transmit uplink data to the base station, for example through RRC connection recovery request signaling.

In step 201, the UE may save data to be uploaded. Having detected uplink data to be transmitted to the base station, the UE may save the uplink data in a local buffer.

In step 202, the UE may start RLAU. While starting RLAU, the UE may read the uplink data in the local buffer.

In step 203, the UE may send random access request signaling to the base station.

In step 204, the base station may send a random access response signaling to the UE.

In step 205, the UE may send, to the base station, RRC connection recovery request signaling. The RRC connection recovery request signaling may include the uplink data.

In step 206, the base station may send the UE an RRC connection recovery response signaling.

In the embodiment, having detected uplink data to be transmitted to the base station, the UE may first save the uplink data in a designated buffer. Then, while starting RLAU, the UE may read the uplink data in the designated buffer. The UE may transmit the uplink data to the base station through request signaling corresponding to the RLAU, thereby implementing combination of an RLAU flow with data transmission, allowing the base station to receive uplink data transmitted by UE in an inactive state, as well as improving efficiency in data transmission.

In an embodiment, the RLAU in step 120 may be RLAU triggered by a designated event. In an embodiment, the RLAU may be triggered periodically. The designated event may include, but is not limited to, the UE moving from one Radio Access Network based Notification Area (RNA) to another RNA. In the embodiments, the UE may transmit uplink data by RLAU triggered by a designated event, RLAU triggered periodically, etc., thereby increasing reliability of data transmission.

Figure 3:
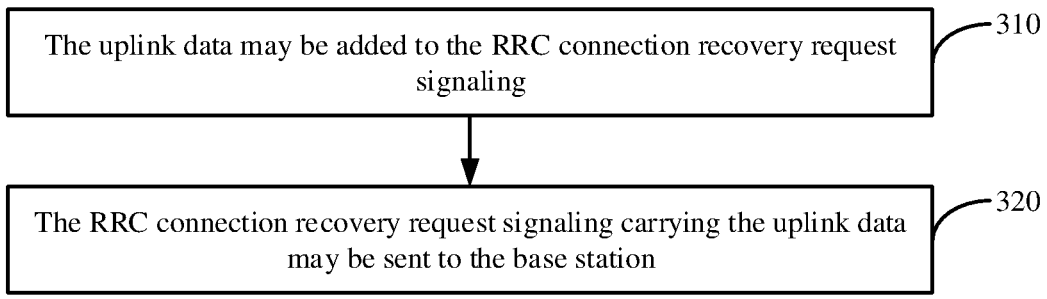
FIG. 3 is a flowchart of a method for transmitting data according to an exemplary embodiment.

In an embodiment, as shown in FIG. 3, in step 130, the request signaling may be RRC connection recovery request signaling. In step 130, the uplink data may be transmitted to the base station in the request signaling corresponding to the RLAU through the following steps.

In step 310, the uplink data may be added to the RRC connection recovery request signaling.

In step 320, the RRC connection recovery request signaling carrying the uplink data may be sent to the base station.

In the embodiment, after the RLAU is started, uplink data may be included in the RRC connection recovery request signaling. The RRC connection recovery request signaling carrying the uplink data may be sent to the base station, thereby diversifying modes of transmitting uplink data, increasing practicality in data transmission.

Figure 4:
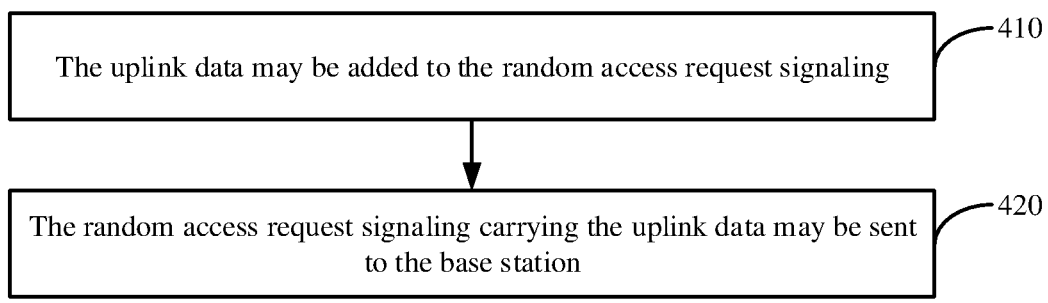
FIG. 4 is a flowchart of a method for transmitting data according to an exemplary embodiment.

In an embodiment, as shown in FIG. 4, in step 130, the request signaling may be random access request signaling. In step 130, the uplink data may be transmitted to the base station in the request signaling corresponding to the RLAU through the following steps.

In step 410, the uplink data may be included in the random access request signaling.

In step 420, the random access request signaling carrying the uplink data may be sent to the base station.

In the embodiment, after the RLAU is started, uplink data may be included in the random access request signaling. The random access request signaling carrying the uplink data may be sent to the base station, thereby diversifying modes of transmitting uplink data, increasing practicality in data transmission.

In an embodiment, in step 420, the random access request signaling may further include RRC connection recovery request signaling. In this mode, UE may include both uplink data and RRC connection recovery request signaling in random access request signaling, and then send the random access request signaling to the base station.

In the embodiment, after the RLAU is started, both uplink data and RRC connection recovery request signaling may be included in random access request signaling. Then, the random access request signaling may be sent to the base station, thereby simplifying an RLAU flow, as well as increasing a rate of data transmission.

In an embodiment, downlink data may be acquired from a response instruction sent by the base station, implementation of which may include, but is not limited to, any of the following modes.

In a first mode, RRC connection recovery response signaling sent by the base station may be received. The RRC connection recovery response signaling may include downlink data to be transmitted to the UE by the base station. Then, the downlink data may be acquired from the RRC connection recovery response signaling.

In a second mode, random access response signaling sent by the base station may be received. The random access response signaling may include downlink data to be transmitted to the UE by the base station. Then, the downlink data may be acquired from the random access response signaling.

In the embodiment, as the RRC connection recovery response signaling or the random access response signaling sent by the base station includes downlink data, the UE may acquire the downlink data in the RRC connection recovery response signaling or the random access response signaling without having to monitor paging signaling sent by the base station, thereby diversifying modes of acquiring downlink data by UE, as well as improving efficiency in acquiring downlink data by UE.

Figure 5:
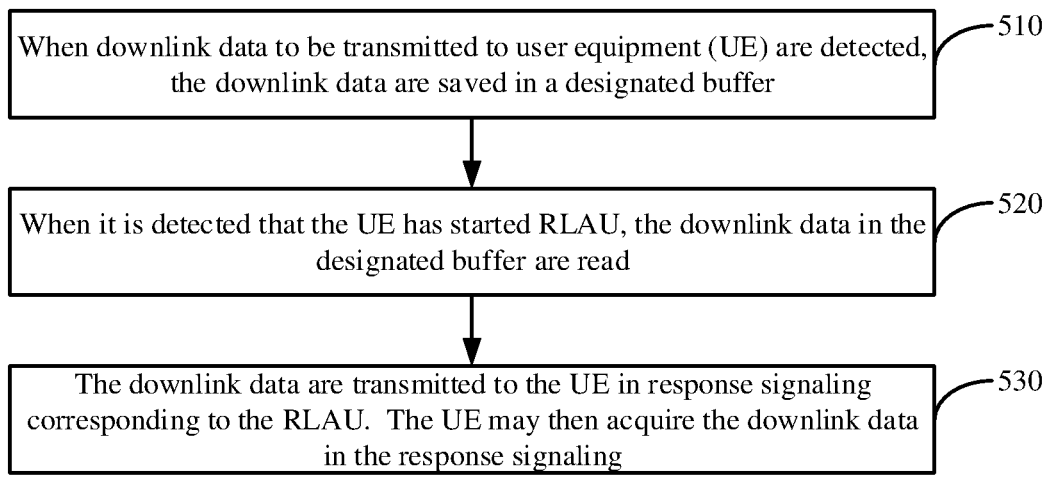
FIG. 5 is a flowchart of a method for transmitting data according to an exemplary embodiment.
Figure 6:
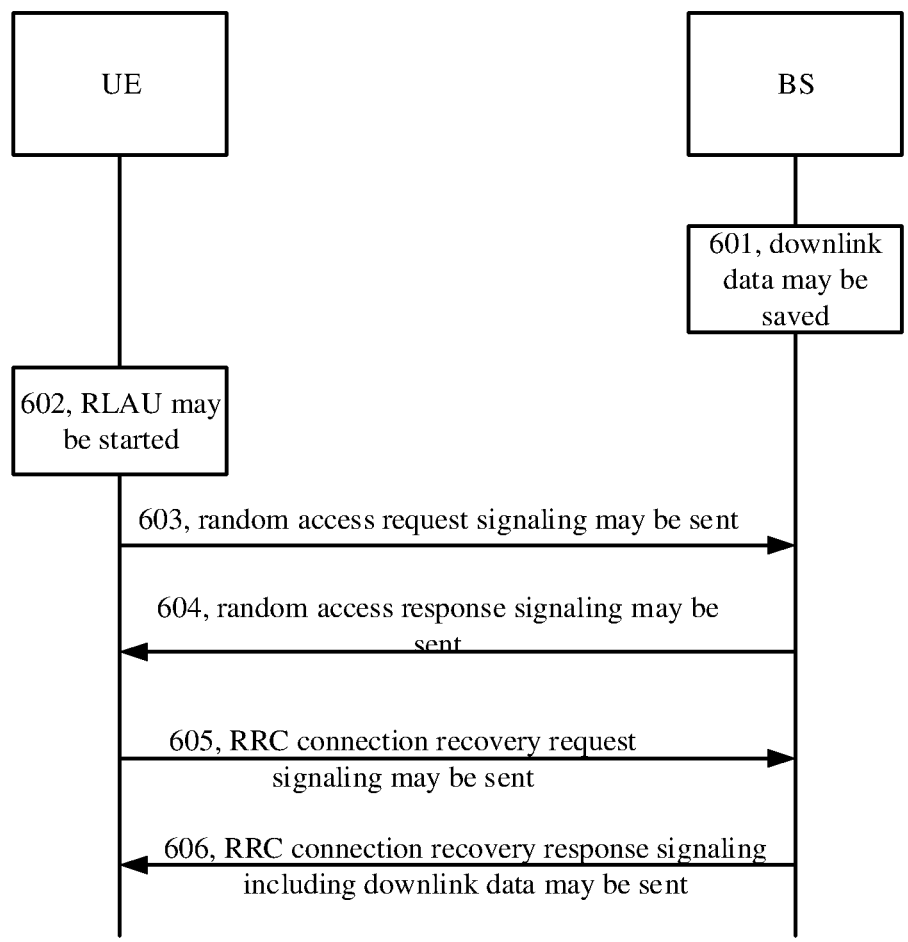
FIG. 6 is a schematic diagram of a method for transmitting data according to an exemplary embodiment.

FIG. 5 is a flowchart of a method for transmitting data according to an exemplary embodiment. FIG. 6 is a schematic diagram of a method for transmitting data according to an exemplary embodiment. The method for transmitting data may apply to a base station. As shown in FIG. 5, the method for transmitting data may include the following steps.

In step 510, when downlink data to be transmitted to user equipment (UE) are detected, the downlink data are saved in a designated buffer.

In an embodiment, the UE may be in an inactive state.

When downlink data to be transmitted to the UE are detected, the base station may first save the downlink data in a designated buffer. Then, the downlink data may be transmitted to the UE along with response signaling corresponding to RLAU when the UE starts the RLAU. The designated buffer may be a buffer of the base station per se.

In step 520, when it is detected that the UE has started RLAU, the downlink data are read from the designated buffer.

In step 530, the downlink data are transmitted to the UE in response signaling corresponding to the RLAU. The UE may then acquire the downlink data in the response signaling.

In an embodiment, the response signaling corresponding to the RLAU may be response signaling sent to the UE by the base station. The response signaling may be random access response signaling sent to the UE by the base station. The response signaling may be RRC connection recovery response signaling sent to the UE by the base station.

As shown in FIG. 6, an exemplary scene may include the base station and the UE. The base station may transmit downlink data to the UE, for example through RRC connection recovery response signaling.

In step 601, the base station may save downlink data. Having detected downlink data to be transmitted to the UE, the base station may save the downlink data in a local buffer.

In step 602, the UE may start RLAU. When the UE starts the RLAU, the base station may read the downlink data in the local buffer.

In step 603, the UE may send a random access request instruction to the base station.

In step 604, the base station may send random access response signaling to the UE.

In step 605, the UE may send, to the base station, RRC connection recovery request signaling.

In step 606, the base station may send, to the UE, RRC connection recovery response signaling. The RRC connection recovery response signaling may include the downlink data.

In the embodiment, having detected downlink data to be transmitted to the UE, instead of triggering paging, the base station may first save the downlink data in a designated buffer. Then, when it is detected that the UE has started the RLAU, the base station may read the downlink data in the designated buffer. The base station may transmit the downlink data to the UE through response signaling corresponding to the RLAU, thereby implementing combination of an RLAU flow with data transmission, allowing the base station to transmit downlink data to the UE in an inactive state, as well as improving efficiency in data transmission.

In an embodiment, the RLAU in step 520 may be RLAU triggered by a designated event. In an embodiment, the RLAU may be triggered periodically. The designated event may include, but is not limited to, the UE may moving from one Radio Access Network based Notification Area (RNA) to another RNA.

In addition, in step 520, it may be detected that the UE has started the RLAU, in a mode including, but not limited to, the following: when receiving random access request signaling sent by the UE, it may be determined, according to the random access request signaling, that the UE has started the RLAU.

In the embodiment, downlink data may be transmitted when the UE starts the RLAU triggered by a designated event, the RLAU triggered periodically, etc., thereby increasing reliability of data transmission.

Figure 7:
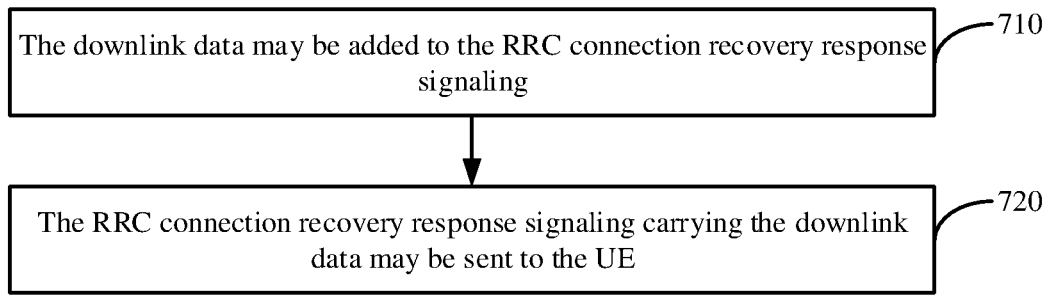
FIG. 7 is a flowchart of a method for transmitting data according to an exemplary embodiment.

In an embodiment, as shown in FIG. 7, in step 530, the response signaling may be RRC connection recovery response signaling. In step 530, the downlink data may be transmitted to the UE in the response signaling corresponding to the RLAU through the following steps.

In step 710, the downlink data may be added to the RRC connection recovery response signaling.

In step 720, the RRC connection recovery response signaling carrying the downlink data may be sent to the UE.

In the embodiment, after the UE starts the RLAU, the base station may include downlink data in the RRC connection recovery response signaling. The base station may send the RRC connection recovery response signaling carrying the downlink data to the UE, thereby diversifying modes of transmitting downlink data, increasing practicality in data transmission.

Figure 8:
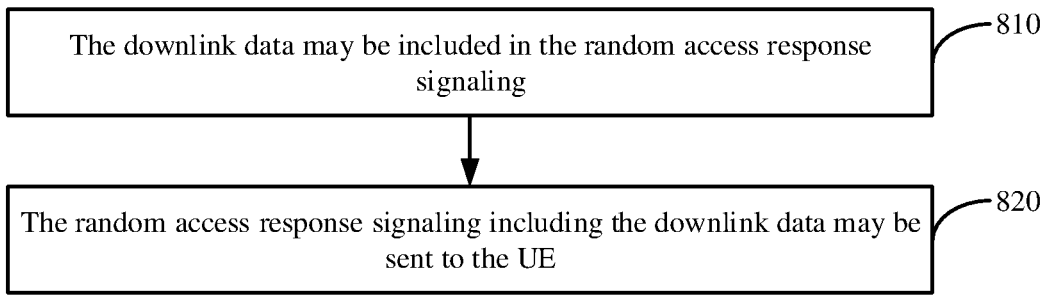
FIG. 8 is a flowchart of a method for transmitting data according to an exemplary embodiment.

In an embodiment, as shown in FIG. 8, in step 530, the response signaling may be random access response signaling. In step 530, the downlink data may be transmitted to the UE in the response signaling corresponding to the RLAU through the following steps.

In step 810, the downlink data may be included in the random access response signaling.

In step 820, the random access response signaling carrying the downlink data may be sent to the UE.

In the embodiment, after the UE starts the RLAU, the base station may include downlink data in random access response signaling. The base station may send the random access response signaling carrying the downlink data to the UE, increasing practicality in data transmission.

In an embodiment, in step 820, the random access response signaling may further include RRC connection recovery response signaling. In this mode, the base station may include both downlink data and RRC connection recovery response signaling in random access response signaling. Then, the base station may send the random access response signaling to the UE.

In the embodiment, after the UE starts the RLAU, the base station may include both downlink data and RRC connection recovery response signaling in random access response signaling. Then, the base station may send the random access response signaling to the UE, thereby simplifying an RLAU flow, as well as increasing a rate of data transmission.

In an embodiment, uplink data may be acquired from request signaling sent by the UE, implementation of which may include, but is not limited to, any of the following modes.

In a first mode, when RRC connection recovery request signaling sent by the UE is received and the RRC connection recovery request signaling includes uplink data to be transmitted to the base station by the UE, the uplink data in the RRC connection recovery request signaling may be acquired.

In a second mode, when random access request signaling sent by the UE including uplink data is received, the uplink data in the random access request signaling may be acquired.

In the embodiment, as the random access request signaling or the RRC connection recovery request signaling sent by the UE includes uplink data, the base station may acquire the uplink data in the RRC connection recovery request signaling or the random access request signaling, thereby diversifying modes of acquiring uplink data by the base station, as well as improving efficiency in acquiring uplink data by the base station.

Figure 9:
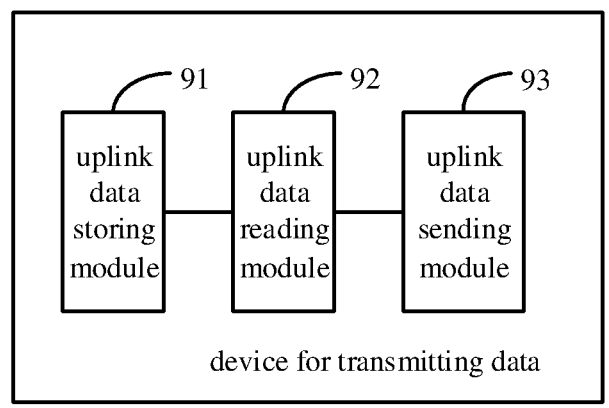
FIG. 9 is a block diagram of a device for transmitting data according to an exemplary embodiment.

FIG. 9 is a block diagram of a device for transmitting data according to an exemplary embodiment. The device may apply to UE. The device may perform the method for transmitting data shown in FIG. 1. As shown in FIG. 9, the device for transmitting data may include an uplink data storing module 91, an uplink data reading module 92, and an uplink data sending module 93.

The uplink data storing module 91 may be configured to, in response to detecting uplink data to be transmitted to a base station, save the uplink data in a designated buffer.

The uplink data reading module 92 may be configured to, in response to starting Radio Access Network Location Area Update (RLAU), read the uplink data in the designated buffer.

The uplink data sending module 93 may be configured to transmit the uplink data to the base station through request signaling corresponding to the RLAU. The base station then acquires the uplink data in the request signaling.

In the embodiment, having detected uplink data to be transmitted to the base station, the UE may first save the uplink data in a designated buffer. Then, while starting RLAU, the UE may read the uplink data in the designated buffer. The UE may transmit the uplink data to the base station through request signaling corresponding to the RLAU, thereby implementing combination of an RLAU flow with data transmission, allowing the base station to receive uplink data transmitted by the UE in an inactive state, as well as improving efficiency in data transmission.

In an embodiment, the RLAU may be triggered by a designated event. In an embodiment, the RLAU may be triggered periodically.

In the embodiments, the UE may transmit uplink data by RLAU triggered by a designated event, RLAU triggered periodically, etc., thereby increasing reliability of data transmission.

Figure 10:
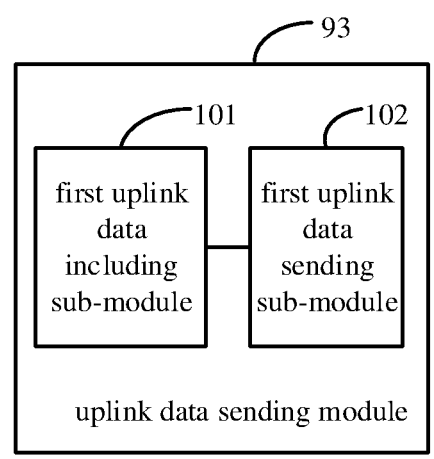
FIG. 10 is a block diagram of a device for transmitting data according to an exemplary embodiment.

In an embodiment, the request signaling may be Radio Resource Control (RRC) connection recovery request signaling. As shown in FIG. 10, the uplink data sending module 93 may include a first uplink data including sub-module 101 and a first uplink data sending sub-module 102.

The first uplink data including sub-module 101 may be configured to add the uplink data to the RRC connection recovery request signaling.

The first uplink data sending sub-module 102 may be configured to send, to the base station, the RRC connection recovery request signaling carrying the uplink data.

In the embodiment, after the RLAU is the started, the uplink data may be included in RRC connection recovery request signaling. The RRC connection recovery request signaling carrying the uplink data may be sent to the base station, thereby diversifying modes of transmitting uplink data, increasing practicality in data transmission.

Figure 11:
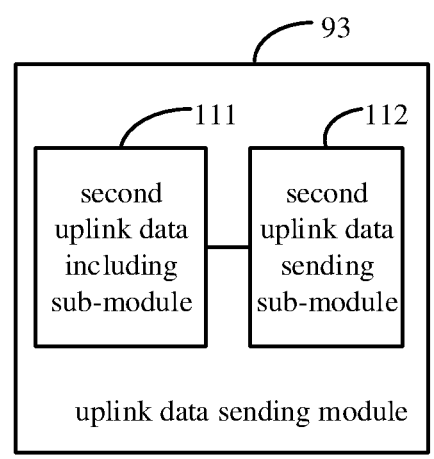
FIG. 11 is a block diagram of a device for transmitting data according to an exemplary embodiment.

In an embodiment, the request signaling may be random access request signaling. As shown in FIG. 11, the uplink data sending module 93 may include a second uplink data including sub-module 111 and a second uplink data sending sub-module 112.

The second uplink data including sub-module 111 may be configured to add the uplink data to the random access request signaling.

The second uplink data sending sub-module 112 may be configured to send, to the base station, the random access request signaling carrying the uplink data.

In the embodiment, after the RLAU is started, uplink data may be included in random access request signaling. The random access request signaling carrying the uplink data may be sent to the base station, thereby diversifying modes of transmitting uplink data, increasing practicality in data transmission.

In an embodiment, the random access request signaling may further include RRC connection recovery request signaling.

In the embodiment, after the RLAU is started, both uplink data and RRC connection recovery request signaling may be included in random access request signaling. Then, the random access request signaling may be sent to the base station, thereby simplifying an RLAU flow, as well as increasing a rate of data transmission.

Figure 12:
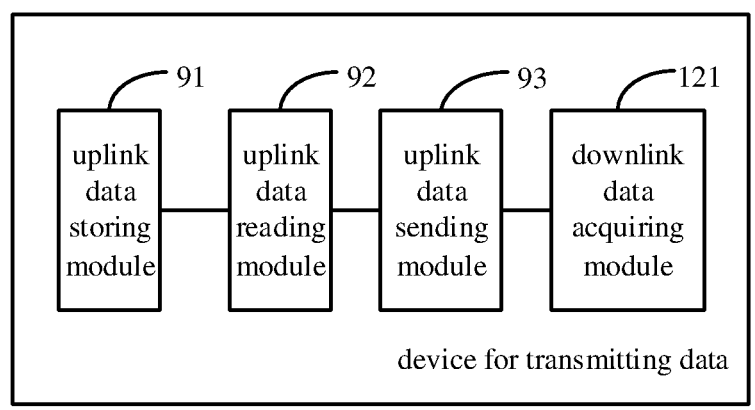
FIG. 12 is a block diagram of a device for transmitting data according to an exemplary embodiment.

In an embodiment, as shown in FIG. 12, the device for transmitting data may further include a downlink data acquiring module 121.

The downlink data acquiring module 121 may be configured to acquire downlink data in RRC connection recovery response signaling, if the RRC connection recovery response signaling sent by the base station is received and the RRC connection recovery response signaling includes the downlink data to be transmitted to the UE by the base station.

The downlink data acquiring module 121 may be configured to acquire downlink data in random access response signaling, if the random access response signaling sent by the base station is received and the random access response signaling includes the downlink data.

In the embodiment, as the RRC connection recovery response signaling or the random access response signaling sent by the base station includes downlink data, the UE may acquire the downlink data in the RRC connection recovery response signaling or the random access response signaling without having to monitor paging signaling sent by the base station, thereby diversifying modes of acquiring downlink data by the UE, as well as improving efficiency in acquiring downlink data by the UE.

Figure 13:
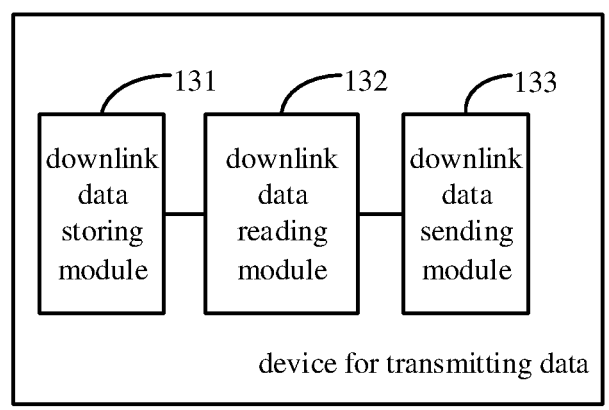
FIG. 13 is a block diagram of a device for transmitting data according to an exemplary embodiment.

FIG. 13 is a block diagram of a device for transmitting data according to an exemplary embodiment. The device may apply to a base station. The device may perform the method for transmitting data shown in FIG. 5. As shown in FIG. 13, the device for transmitting data may include a downlink data storing module 131, a downlink data reading module 132, and a downlink data sending module 133.

The downlink data storing module 131 may be configured to, in response to detecting downlink data to be transmitted to user equipment (UE), save the downlink data in a designated buffer.

The downlink data reading module 132 may be configured to, in response to detecting that the UE has started Radio Access Network Location Area Update (RLAU), read the downlink data in the designated buffer.

The downlink data sending module 133 may be configured to transmit the downlink data to the UE in response signaling corresponding to the RLAU. The UE then acquires the downlink data in the response signaling.

In the embodiment, having detected downlink data to be transmitted to the UE, instead of triggering paging, the base station may first save the downlink data in a designated buffer. Then, when it is detected that the UE has started RLAU, the base station may read the downlink data in the designated buffer. The base station may transmit the downlink data to the UE through response signaling corresponding to the RLAU, thereby implementing combination of an RLAU flow with data transmission, allowing the base station to transmit downlink data to the UE in an inactive state, as well as improving efficiency in data transmission.

Figure 14:
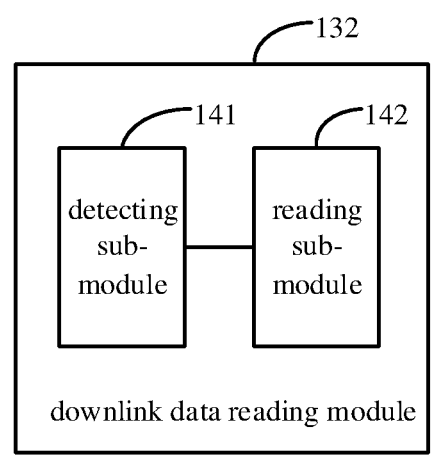
FIG. 14 is a block diagram of a device for transmitting data according to an exemplary embodiment.

In an embodiment, the RLAU may be RLAU triggered by a designated event. In an embodiment, the RLAU may be triggered periodically. As shown in FIG. 14, the downlink data reading module 132 may include a detecting sub-module 141 and a reading sub-module 142.

The detecting sub-module 141 may be configured to, in response to receiving random access request signaling sent by the UE, determine, according to the random access request signaling, that the UE has started the RLAU.

The reading sub-module 142 may be configured to read the downlink data in the designated buffer.

In the embodiment, downlink data may be transmitted when the UE starts the RLAU triggered by a designated event, the RLAU triggered periodically, etc., thereby increasing reliability of data transmission.

Figure 15:
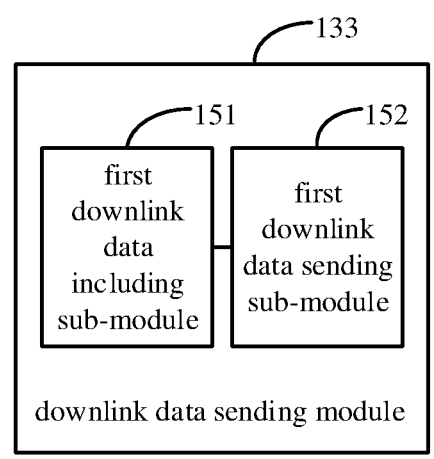
FIG. 15 is a block diagram of a device for transmitting data according to an exemplary embodiment.

In an embodiment, the response signaling may be RRC connection recovery response signaling. As shown in FIG. 15, the downlink data sending module 133 may include a first downlink data including sub-module 151 and a first downlink data sending sub-module 152.

The first downlink data including sub-module 151 may be configured to add the downlink data to the RRC connection recovery response signaling.

The first downlink data sending sub-module 152 may be configured to send, to the UE, the RRC connection recovery response signaling carrying the downlink data.

In the embodiment, after the UE starts the RLAU, the base station may include downlink data in RRC connection recovery response signaling. The base station may send the RRC connection recovery response signaling carrying the downlink data to the UE, thereby diversifying modes of transmitting downlink data, increasing practicality in data transmission.

Figure 16:
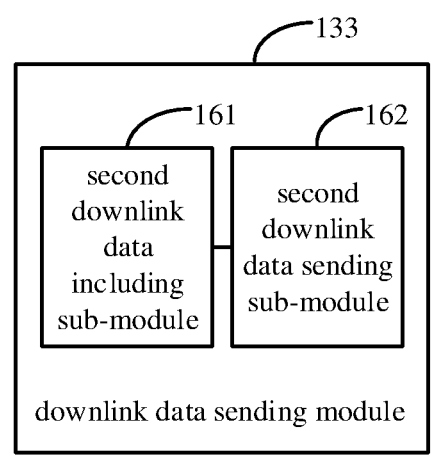
FIG. 16 is a block diagram of a device for transmitting data according to an exemplary embodiment.

In an embodiment, the response signaling may be random access response signaling. As shown in FIG. 16, the downlink data sending module 133 may include a second downlink data including sub-module 161 and a second downlink data sending sub-module 162.

The second downlink data including sub-module 161 may be configured to add the downlink data to the random access response signaling.

The second downlink data sending sub-module 162 may be configured to send, to the UE, the random access response signaling carrying the downlink data.

In the embodiment, after the UE starts the RLAU, the base station may include downlink data in random access response signaling. The base station may send the random access response signaling carrying the downlink data to the UE, increasing practicality in data transmission.

In an embodiment, the random access response signaling may further include RRC connection recovery response signaling.

In the embodiment, after the UE starts RLAU, the base station may include both downlink data and RRC connection recovery response signaling in random access response signaling. Then, the base station may send the random access response signaling to the UE, thereby simplifying an RLAU flow, as well as increasing a rate of data transmission.

Figure 17:
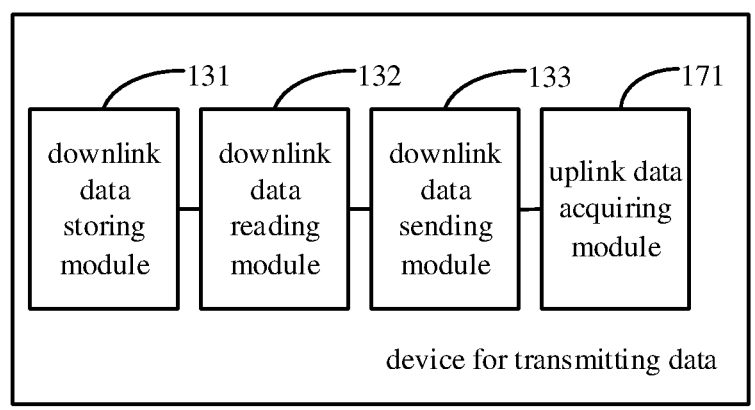
FIG. 17 is a block diagram of a device for transmitting data according to an exemplary embodiment.

In an embodiment, as shown in FIG. 17, the device for transmitting data may further include an uplink data acquiring module 171.

The uplink data acquiring module 171 may be configured to, in response to receiving Radio Resource Control (RRC) connection recovery request signaling sent by the UE and the RRC connection recovery request signaling carrying uplink data to be transmitted to the base station by the UE, acquire the uplink data in the RRC connection recovery request signaling.

The uplink data acquiring module 171 may be configured to, in response to receiving the random access response signaling sent by the UE carrying the uplink data, acquire the uplink data in the random access response signaling.

In the embodiment, as the random access request signaling or the RRC connection recovery request signaling sent by the UE includes uplink data, the base station may acquire the uplink data in the RRC connection recovery request signaling or the random access request signaling, thereby diversifying modes of acquiring uplink data by the base station, as well as improving efficiency in acquiring uplink data by the base station.

The device embodiments basically correspond to the method embodiments. The device embodiments described herein are exemplary. The modules of the device may or may not be physically separate. The modules of the device may be located in one place, or distributed over multiple networks. Some or all of the modules herein may be selected as needed.

In an embodiment, a non-transitory computer-readable storage medium has stored thereon a computer program for performing the method for transmitting data as illustrated in any one of FIG. 1 to FIG. 4.

In an embodiment, a non-transitory computer-readable storage medium has stored thereon a computer program for performing the method for transmitting data as illustrated in any one of FIG. 5 to FIG. 8.

In an embodiment, a device for transmitting data may be part of UE or the UE. The device includes a processor and a memory storing an instruction executable by the processor. The processor is configured to: in response to detecting uplink data to be transmitted to a base station, save the uplink data in a designated buffer; in response to starting Radio Access Network Location Area Update (RLAU), read the uplink data in the designated buffer; and transmit the uplink data to the base station through request signaling corresponding to the RLAU, such that the base station acquires the uplink data in the request signaling.

Figure 18:
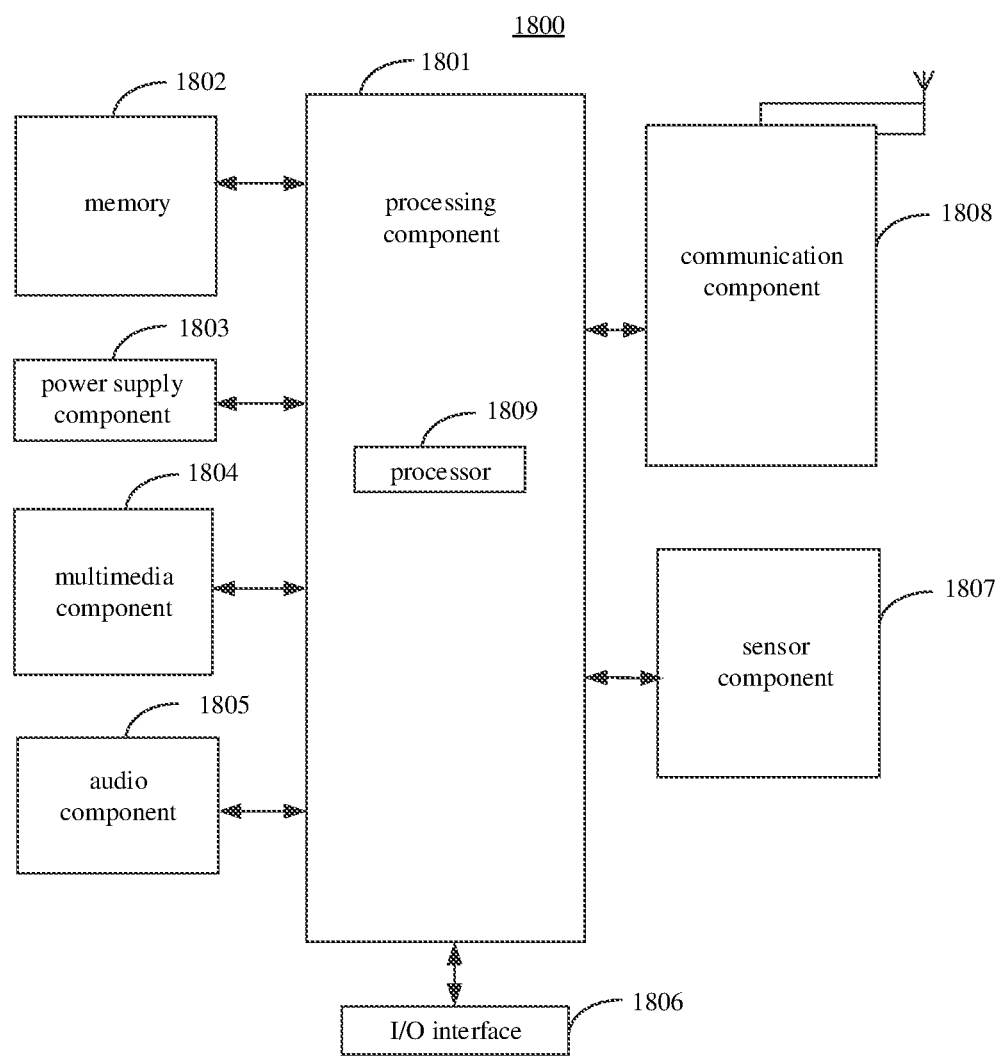
FIG. 18 is a schematic diagram of a device for transmitting data according to an exemplary embodiment.

FIG. 18 is a schematic diagram of a device 1800 for transmitting data according to an exemplary embodiment. The device 1800 may be UE such as a computer, a mobile phone, a digital broadcast terminal, messaging equipment, a gaming console, tablet equipment, medical equipment, exercise equipment, a personal digital assistant, etc.

Referring to FIG. 18, the device 1800 may include at least one of a processing component 1801, memory 1802, a power supply component 1803, a multimedia component 1804, an audio component 1805, an Input/Output (I/O) interface 1806, a sensor component 1807, or a communication component 1808.

The processing component 1801 may generally control an overall operation of the device 1800, such as operations associated with display, a telephone call, data communication, a camera operation, a recording operation, etc. The processing component 1801 may include one or more processors 1809 to execute instructions so as to complete all or a part of an aforementioned method. In addition, the processing component 1801 may include one or more modules to facilitate interaction between the processing component 1801 and other components. For example, the processing component 1801 may include a multimedia portion to facilitate interaction between the multimedia component 1804 and the processing component 1801.

The memory 1802 may be configured to store various types of data to support the operation at the device 1800. Examples of such data may include instructions of any application or method configured to operate on the device 1800, contact data, phonebook data, messages, pictures, videos, etc. The memory 1802 may be realized by any type of transitory or non-transitory storage equipment or a combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, a magnetic disk, a compact disk, etc.

The power supply component 1803 may supply electric power to various components of the device 1800. The power supply component 1803 may include a power management system, one or more power sources, and other components related to generating, managing, and distributing electricity for the device 1800.

The multimedia component 1804 may include a screen that provides an output interface between the device 1800 and a user. The screen may include a Liquid Crystal Display (LCD), a Touch Panel (TP), etc. If the screen includes a TP, the screen may be realized as a touch screen to receive a signal input by a user. The TP may include one or more touch sensors for sensing touch, slide, and gestures on the TP. The one or more touch sensors not only may sense the boundary of a touch or slide move, but also detect the duration and pressure related to the touch or slide move. The multimedia component 1804 may include at least one of a front camera or a rear camera. When the device 1800 is in an operation mode such as a photographing mode or a video mode, at least one of the front camera or the rear camera may receive external multimedia data. Each of the front camera or the rear camera may be a fixed optical lens system or may have a focal length and be capable of optical zooming.

The audio component 1805 may be configured to output and/or input an audio signal. For example, the audio component 1805 may include a microphone (MIC). When the device 1800 is in an operation mode such as a call mode, a recording mode, a voice recognition mode, etc., the MIC may be configured to receive an external audio signal. The received audio signal may be further stored in the memory 1802 or may be sent via the communication component 1808. The audio component 1805 may further include a loudspeaker configured to output the audio signal.

The I/O interface 1806 may provide an interface between the processing component 1801 and a peripheral interface portion. Such a peripheral interface portion may be a keypad, a click wheel, a button, etc. Such a button may include but is not limited to at least one of a homepage button, a volume button, a start button, or a lock button.

The sensor component 1807 may include one or more sensors for assessing various states of the device 1800. For example, the sensor component 1807 may detect an on/off state of the device 1800 and relative positioning of components such as the display and the keypad of the device 1800. The sensor component 1807 may further detect a change in the position of the device 1800 or of a component of the device 1800, whether there is contact between the device 1800 and a user, the orientation or acceleration/deceleration of the device 1800, a change in the temperature of the device 1800, etc. The sensor component 1807 may include a proximity sensor configured to detect existence of a nearby object without physical contact. The sensor component 1807 may further include an optical sensor such as a Complementary Metal-Oxide-Semiconductor (CMOS) or a Charge-Coupled-Device (CCD) image sensor used in an imaging application. The sensor component 1807 may further include an acceleration sensor, a gyroscope sensor, a magnetic sensor, a pressure sensor, a temperature sensor, etc.

The communication component 1808 may be configured to facilitate wired or wireless communication between the device 1800 and other equipment. The device 1800 may access a wireless network based on a communication standard such as Wi-Fi, 4G, 5G, or a combination thereof. The communication component 1808 may broadcast related information or receive a broadcast signal from an external broadcast management system via a broadcast channel. The communication component 1808 may include a Near Field Communication (NFC) module for short-range communication. The communication component 1808 may be based on technology such as Radio Frequency Identification (RFID), Infrared Data Association (IrDA), Ultra-Wideband (UWB) technology, Bluetooth (BT), etc.

The device 1800 may be realized by one or more electronic components such as an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, etc., to implement the method.

A non-transitory computer-readable storage medium including instructions, such as the memory 1802 including instructions, may be provided. The instructions may be executed by the processor 1809 of the device 1800 to implement an aforementioned method. For example, the non-transitory computer-readable storage medium may be Read-Only Memory (ROM), Random Access Memory (RAM), Compact Disc Read-Only Memory (CD-ROM), a magnetic tape, a floppy disk, optical data storage equipment, etc.

When executed by the processor, an instruction in the storage medium causes the device 1800 to perform the above described method for transmitting data.

In an embodiment, a device for transmitting data may be part of a base station or the base station. The device includes a processor and a memory storing an instruction executable by the processor. The processor is configured to: in response to detecting downlink data to be transmitted to user equipment (UE), save the downlink data in a designated buffer; in response to detecting that the UE has started Radio Access Network Location Area Update (RLAU), read the downlink data in the designated buffer; and transmit the downlink data to the UE in response signaling corresponding to the RLAU, such that the UE acquires the downlink data in the response signaling.

Figure 19:
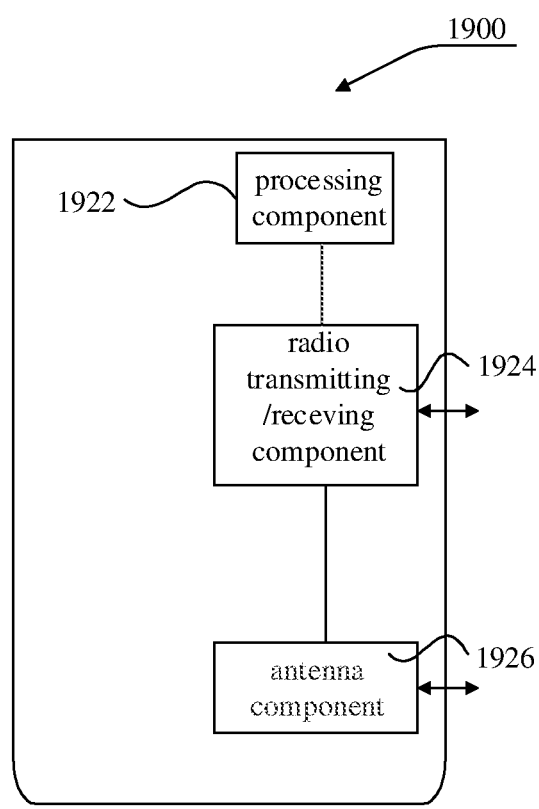
FIG. 19 is a schematic diagram of a device for transmitting data according to an exemplary embodiment.

FIG. 19 is a schematic diagram of a device 1900 for transmitting data according to an exemplary embodiment. The device 1900 may be provided as a base station. Referring to FIG. 19, the device 1900 includes a processing component 1922, a radio transmitting/receiving component 1924, an antenna component 1926, and a signal processing part dedicated to a radio interface. The processing component 1922 may further include one or more processors. A processor of the processing component 1922 may be configured to perform the above described method for transmitting data.

Other embodiments will be apparent to one skilled in the art after considering the specification and practiced the disclosure herein. The present application is intended to cover any variation, use, or adaptation of the disclosure following the general principle of the disclosure and including such departures from the disclosure as come within knowledge or customary practice in the art. The embodiments described herein are exemplary only, with a true scope and spirit of the disclosure being indicated by the appended claims.

The disclosure is not limited to the exact construction that has been described above and illustrated in the accompanying drawings. Various modifications and changes can be made without departing from the scope of the disclosure. It is intended that the scope of the disclosure be limited only by the appended claims.

The invention claimed is:

1. A method for transmitting data, applying to user equipment (UE), the method comprising:
   in response to detecting uplink data to be transmitted to a base station, saving the uplink data in a designated buffer;
   in response to starting Radio Access Network Location Area Update (RLAU), reading the uplink data in the designated buffer; and
   transmitting the uplink data to the base station through request signaling corresponding to the RLAU, such that the base station acquires the uplink data in the request signaling, wherein the request signaling is random access request signaling, and the transmitting the uplink data to the base station through request signaling corresponding to the RLAU comprises:
   adding the uplink data to the random access request signaling; and
   sending, to the base station, the random access request signaling carrying the uplink data,
   wherein the random access request signaling further comprises Radio Resource Control (RRC) connection recovery request signaling.

2. The method of claim 1, wherein the RLAU comprises RLAU triggered by a designated event and RLAU triggered periodically.

3. The method of claim 2, wherein the random access request signaling is the RRC connection recovery request signaling, and
   the transmitting the uplink data to the base station through request signaling corresponding to the RLAU comprises:
   adding the uplink data to the RRC connection recovery request signaling; and
   sending, to the base station, the RRC connection recovery request signaling carrying the uplink data.

4. The method of claim 1, further comprising:
   in response to receiving Radio Resource Control (RRC) connection recovery response signaling sent by the base station carrying downlink data to be transmitted to the UE by the base station, acquiring the downlink data in the RRC connection recovery response signaling.

5. The method of claim 1, further comprising:
   in response to receiving random access response signaling sent by the base station carrying downlink data, acquiring the downlink data in the random access response signaling.

6. A method for transmitting data, applying to a base station, the method comprising:
   in response to detecting downlink data to be transmitted to user equipment (UE), saving the downlink data in a designated buffer;
   in response to detecting that the UE has started Radio Access Network Location Area Update (RLAU), reading the downlink data in the designated buffer; and
   transmitting the downlink data to the UE in response signaling corresponding to the RLAU, such that the UE acquires the downlink data in the response signaling,
   wherein the response signaling is random access response signaling, and
   the transmitting the downlink data to the UE in response signaling corresponding to the RLAU comprises:
   adding the downlink data to the random access response signaling; and
   sending, to the UE, the random access response signaling carrying the downlink data,
   wherein the random access response signaling further comprises Radio Resource Control (RRC) connection recovery response signaling.

7. The method of claim 6, wherein the RLAU comprises RLAU triggered by a designated event and RLAU triggered periodically, and
   the detecting that the UE has started the RLAU comprises:
   in response to receiving random access request signaling sent by the UE, determining, according to the random access request signaling, that the UE has started the RLAU.

8. The method of claim 7, further comprising at least one of:
in response to receiving Radio Resource Control (RRC) connection recovery request signaling sent by the UE and the RRC connection recovery request signaling carrying uplink data to be transmitted to the base station by the UE, acquiring the uplink data in the RRC connection recovery request signaling; or in response to receiving the random access request signaling sent by the UE carrying the uplink data, acquiring the uplink data in the random access request signaling.

9. User equipment (UE), comprising:

a processor; and a memory storing an instruction executable by the processor, wherein the processor is configured to:

in response to detecting uplink data to be transmitted to a base station, save the uplink data in a designated buffer;

in response to starting Radio Access Network Location Area Update (RLAU), read the uplink data in the designated buffer; and transmit the uplink data to the base station through request signaling corresponding to the RLAU, such that the base station acquires the uplink data in the request signaling, wherein the request signaling is random access request signaling, and in transmitting the uplink data to the base station through request signaling corresponding to the RLAU, the processor is further configured to:

add the uplink data to the random access request signaling; and send, to the base station, the random access request signaling carrying the uplink data, wherein the random access request signaling further comprises Radio Resource Control (RRC) connection recovery request signaling.

* * * * *